Aug. 25, 1936. W. L. KAEHNI ET AL Re. 20,078

VOLTAGE SUPPLY SYSTEM FOR VACUUM TUBES

Original Filed March 10, 1930

INVENTORS
William L. Kaehni and
Frank J. Kaehni,
by:- Justin W. Macklin,
their ATTORNEY.

Reissued Aug. 25, 1936 Re. 20,078

UNITED STATES PATENT OFFICE 20,078

VOLTAGE SUPPLY SYSTEM FOR VACUUM TUBES

William L. Kaehni and Frank J. Kaehni, Cleveland, Ohio

Original No. 1,951,614, dated March 20, 1934, Serial No. 434,544, March 10, 1930. Application for reissue November 15, 1935, Serial No. 50,064

4 Claims. (Cl. 250—27)

This invention relates to a method and apparatus for transforming low voltage, direct current power to high voltage smooth direct current, whereby electrical apparatus using thermionic tubes such as radio receiving, sending or audio-amplification apparatus may be operated from a single low voltage source of current such as a wet cell storage battery.

Heretofore, for the operation of such apparatus, a high voltage current has been supplied by a separate high voltage battery block or by a dyna-motor set. Such battery blocks are very bulky and cumbersome and are expensive and short-lived. The dyna-motor sets are much more expensive and bulky and are inefficient and have moving parts requiring attention or replacement. A separately operated high voltage generator is equally objectionable.

It is one of the objects of our invention to eliminate the use of such expensive and bulky high voltage battery blocks, dyna-motor sets and like equipment in apparatus using thermionic vacuum tubes whereby a compact and easily portable radio receiving or sending set suitable for use in automobiles, airplanes, and other vehicles may be produced.

Another object of our invention is to supply a high voltage direct current from a low voltage direct current source by an inexpensive compact and durable apparatus, which is very efficient and capable of economic quantity production from easily obtainable materials.

A more specific object of our invention is to operate the plate and grid circuits and the filament circuits of radio receiving and sending sets and the like from the usual low voltage wet cell storage battery.

Still another object of our invention is to produce a high voltage alternating current from a low voltage direct current source of supply, whereby radio sets operable by the usual household alternating currents may be operated from a storage battery and thus rendered portable.

Other objects and advantages will become apparent from the following specification in which reference is made to the drawing by the use of numerals.

In the drawing,—

Figure 1:
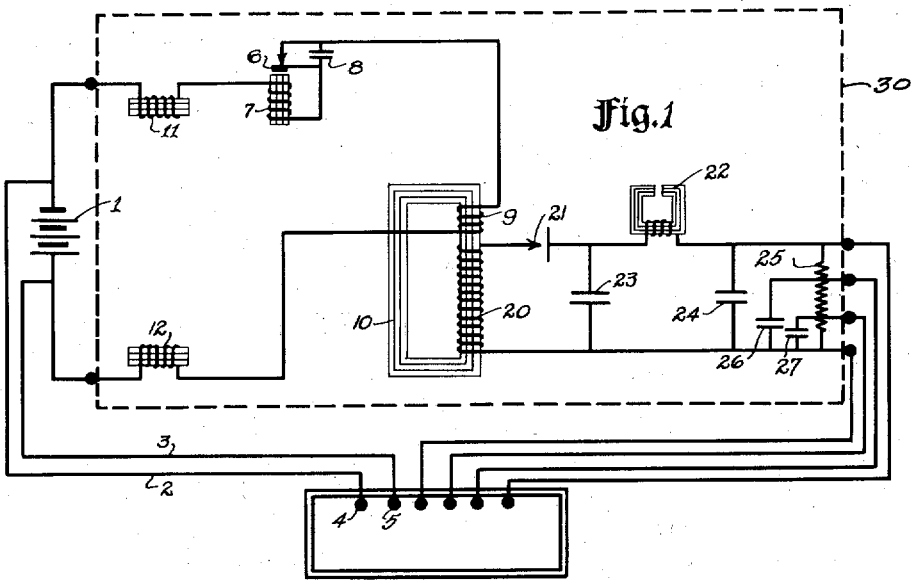
Fig. 1 illustrates a preferred form of apparatus suitable for carrying out our invention and adapted for use with radio receiving, transmitting sets or thermionic tube amplifiers.

For the purpose of illustration, we shall describe an embodiment of our invention for operating a radio receiving set. As illustrated, our invention includes a source of low voltage direct current such as a storage battery, designated as 1. The battery and the low voltage power circuit of the radio set, such as to the A power terminals 4 and 5, are directly connected by suitable conductors 2 and 3. Connected to the same battery is a primary circuit in which is an interrupter, a desirable form of which may include the vibrator 6, operable by the coil magnet 7. The condenser 8 is provided across the circuit breaker of the interrupter to eliminate sparking of contacts in the primary circuit.

Figure 2:
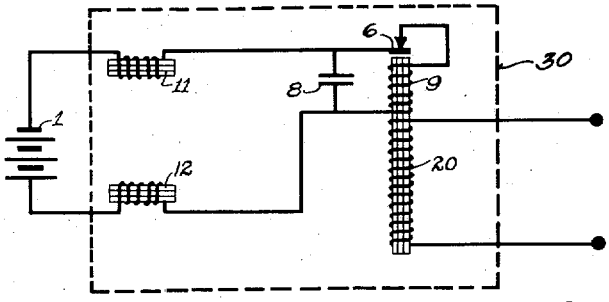
Fig. 2 is a modified form of our apparatus suitable for providing alternating currents.

The primary circuit also includes a primary winding or transformer element 9, wound on a soft iron core 10. This core is preferably of the closed core type, as such tends to give a pulse of current of longer duration for each cycle. The interrupter need not be a separate unit, as described, but may be combined with the transformer element, as illustrated in Fig. 2.

The interruption of the current by an interrupter tends to cause voltage variations in the lead wires to the battery, which would affect the low voltage power circuit directly connected thereto, and also radiate disturbances into space. To eliminate these variations and disturbances and at the same time permit an even flow of current in the primary circuit, we provide choke coils such as 11 and 12 in the primary circuit between the battery and the interrupter within the shield 30.

A single choke coil or some other resistance may be used for this purpose, but is not as effective as the arrangement of coils illustrated. In the circuit arrangement, Fig. 1, the effective value of a single choke coil between the battery 1 and the vibrator 6, as at 11, is much more effective than a single choke coil located in other parts of the primary circuit. A choke coil located at the position of the coil 12 may be sufficiently effective to accomplish satisfactory results in that it provides a choke or disturbance isolating means effectively preventing disturbance and inhibiting the electro-magnetic waves of high frequency resulting from the making and breaking of the primary circuit at the interrupter 6 and from the spark, even though invisible, reaching the sensitive receiving part of the radio set, such as the tuning circuits particularly the radio frequency circuits.

These choke coils used may be of the air core type as well as the iron core type. In fact, the air core has been found to be as efficient as the iron core in obtaining the results of an even flow of current in the primary circuit with a minimum of radio frequency radiation. It will be noted that if either choke coil 11 or 12 be used, or if both of them are used, they are preferably located within a suitable shield such as indicated at 30, Fig. 1. The connecting leads to the battery side of the choke or inductance coils are preferably made as short as possible within shield 30. As shown, choke coils 11 and 12 are placed near a side wall of said shield so that the greater portion of the circuit within the shield is that connecting the choke coils to the primary winding of the transformer 9. The short leads from the battery side of the chokes to the outside of the shield may pick up a little radio frequency energy within the shield and conduct it to the battery leads and to the lead wires 2 and 3 of the set. However, these portions of the battery leads inside of the shield are so short that very little disturbance is thus carried out.

On the core 10 is wound a secondary winding 20 of a greater number of turns than the winding 9, thus forming a step-up transformer. The current induced in the secondary winding by the primary circuit actuates a secondary circuit for operation of plate and grid circuits. The secondary circuit includes a rectifier 21 and a choke coil 22 for rectifying and smoothing the current from the winding 20. Condensers 23 and 24 are provided in a secondary circuit which, with the choke coil 22, even the flow of current passing therethrough. The resistance 25 and suitable bypass condensers 26 and 27 are provided in the secondary circuit for further evening the flow and voltage of the current. This supplies a source of potential for the plus B amplifier, the plus B detector voltage, the minus B and minus C potential of the radio set.

If alternating current is desired for operation of one of the usual household sets, this may be obtained by the apparatus illustrated in Fig. 2. The usual household radio sets use a current of about 110 volts having a 60-cycle frequency, which is well within the range of an apparatus as illustrated. A suitable apparatus includes a primary circuit such as described, which may be modified so that the vibrator element of the interrupter is operated from a transformer element. In this arrangement, as in Fig. 1, a suitable shield 30, indicated in broken lines, may be used.

To obtain the desired voltage and frequency, the vibrator is merely adjusted or constructed to vibrate at the rate of approximately 60 cycles per second, and the voltage is obtained by the proper relation of the number of coil turns in the coil 9 with that of the number of coil turns in the coil 20. Any modification of the number of cycles and the voltage may be made by a variance with the number of variations per second and in the ratio of coil turns. The alternating current induced in the secondary winding by the primary circuit may be connected directly to the alternating current of the lead wires of the set.

Figure 3:
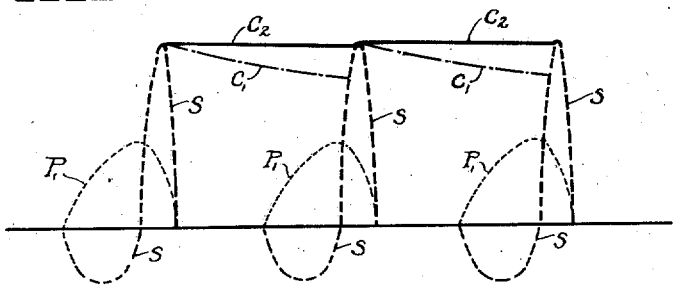
Fig. 3 is a graphical representation of the results obtained by the use of the apparatus illustrated in Fig. 1.

We shall now describe the operation of our invention, referring to Figs. 1 and 3 for clearness. The current from the battery 1 flows through a primary circuit actuating the vibrator 6 by means of the coil 7 and building up a field in the core 10 through the winding 9. Due to the breaking of the circuit by the vibrator 6 an intermittent flow of direct current is obtained in the primary circuit and through the winding 9, as illustrated by the dotted line P—1 in Fig. 3.

Any tendency of the action of the interrupter affecting the voltage at the battery is overcome by means of the choke coils 11 and 12. The interrupted flow of the current through the winding 9 sets up an induced alternating current in the secondary winding 20 as illustrated by the line S. This current has much higher voltage value than the current in the primary circuit. The upper or positive value of this current is then rectified by the rectifier 21, and when so rectified, charges the condenser 23 with a direct current potential of interrupted character. The flow of current from condenser 23 is illustrated by the dot and dash line C—1 of Fig. 3. As there illustrated, the current is more even than the current of the secondary circuit directly from the rectifier. To further dampen and more nearly eliminate these pulsations of current, it is directed through the choke coil 22, preferably of the partially closed core type.

Next, the condenser 24 is provided to even the flow of current still more and produce a uniform direct current of the desired potential, as illustrated by the line C—2 in Fig. 3. This effect may be described in a somewhat different manner. The condenser 23 is intermittently charged by impulses from the secondary winding 20 through the rectifying device 21, the impulses having a wave shape such as shown at S in Fig. 3. During the interval between the peaks of these impulses condenser 23 discharges into the circuit comprising choke coil 22 and condenser 24. It is well known in the art that when a capacitance device such as condenser 24 is charged through a resistance and an inductance that the charging current may be expressed by the relation $$i=\frac{e}{S}\left[\epsilon^{\frac{-R-S}{2L}t}-\epsilon^{\frac{-R-S}{2L}t}\right]$$

$i$=charging current of condenser 24
$e$=potential of condenser 23 in which $$S=\sqrt{R^2-\frac{4L}{C}}$$

R=the ohmic resistance of the circuit from condenser 23 to condenser 24, including the ohmic resistance of the choke coil 22,
L=inductance of the choke coil 22, in henries
C=the capacity of condenser 24, in farads
$t$=time It is well known that when the value of $R^2$ is greater than $$\frac{4L}{C}$$

the current flowing into condenser 24 will be a logarithmic function as represented by the line C—1 in Fig. 3, and simultaneously with this current, the voltage across condenser 24 will build up as a similar logarithmic function. Because of the constantly recurring discharge of condenser 23 the voltage across condenser 24 is maintained practically constant because of the aforementioned relation between resistance, inductance and capacity. As a result of this nearly constant voltage across condenser 24, it discharges into an external circuit, such as a radio set or other current consuming device, with a practically constant current as represented by the line C—2 in Fig. 3. For distributing different voltages as desired to the plus B amplifiers or the plus B terminals of different plate voltage values and the minus B and minus C potential of the apparatus, and additionally smoothing and evening the current, resistances such as 25 and by-pass condensers such as 26 and 27 may be provided in the lead wires to these parts.

The frequency of the alternating current induced in the secondary circuit will, of course, be the same as the frequency of interruption of the current in the primary circuit by the interrupter. A rather high rate of interruption of the current in the primary circuit will provide a suitable current for operation of alternating current radio sets or for conversion into higher voltage of direct current as described. Experience has proven that in a circuit for a transmitting set, a modulation effect is produced when the filter in the circuit is reduced in size. In fact, in such a circuit, the condenser 24 and the choke coil 22 could be dispensed with and very satisfactory results obtained.

While we have described our invention in connection with a radio receiving set, we do not intend to limit this use to such purposes, but intend to include its use with all apparatus using thermionic vacuum tubes for voltage and supply. Audio-amplifiers and various other apparatus wherein thermionic vacuum tubes are employed may be operated with this device.

We claim:

1. In apparatus of the character described, the combination of a battery, a low voltage radio power circuit connected to said battery, a transformer having a primary winding and a high voltage secondary winding, a second circuit including an interrupter and the primary winding of said transformer connected to said battery, and a third circuit including the secondary coil of said transformer, and means for steadying and smoothing the current supplied to said interrupter and for preventing voltage fluctuation produced in said second circuit from materially affecting the current conditions in said first-named circuit, said means comprising a choke coil located between said battery and said interrupter and a second choke coil between said battery and said primary winding.

2. In apparatus of the character described, the combination of a battery, a low voltage radio power circuit connected to said battery, a transformer having a primary winding and a high voltage secondary winding, a second circuit including an interrupter and the primary winding of said transformer connected to said battery, and a third circuit including the secondary coil of said transformer, and means for steadying the high voltage current impressed thereupon, and for steadying and smoothing the current supplied to said interrupter and for preventing voltage fluctuation produced in said second circuit from materially affecting the current conditions in said first-named circuit and for preventing radio frequency emanations from causing disturbances in said first circuit, said means comprising a choke coil located in said second-mentioned circuit.

3. In a system for energizing low voltage and high voltage circuits of a radio receiving set, the combination of a battery, a transformer having a primary and a secondary winding, a circuit from the battery through said primary winding and including an interrupter and choke coil means, circuit connections for leading to a radio receiving device energized by the secondary winding including means for rectifying and smoothing the current therefrom, shielding means inclosing the transformer and interrupter and serving together with said choke means to prevent emanations of radio frequency from causing disturbances in the battery circuit.

4. In a device of the character described, the combination of a battery, an interrupter, a transformer having a primary and secondary winding, choke coil means, a circuit including said battery, primary winding and choke coil means and also including an interrupter, a second circuit energized by said secondary winding, and shielding means inclosing said transformer and interrupter and choke coil means and serving in conjunction with said choke coil means to confine radio frequency energy radiations which originate in the interrupter.

WILLIAM L. KAEHNI.
FRANK J. KAEHNI.